Samuel Zeman INVENTOR.

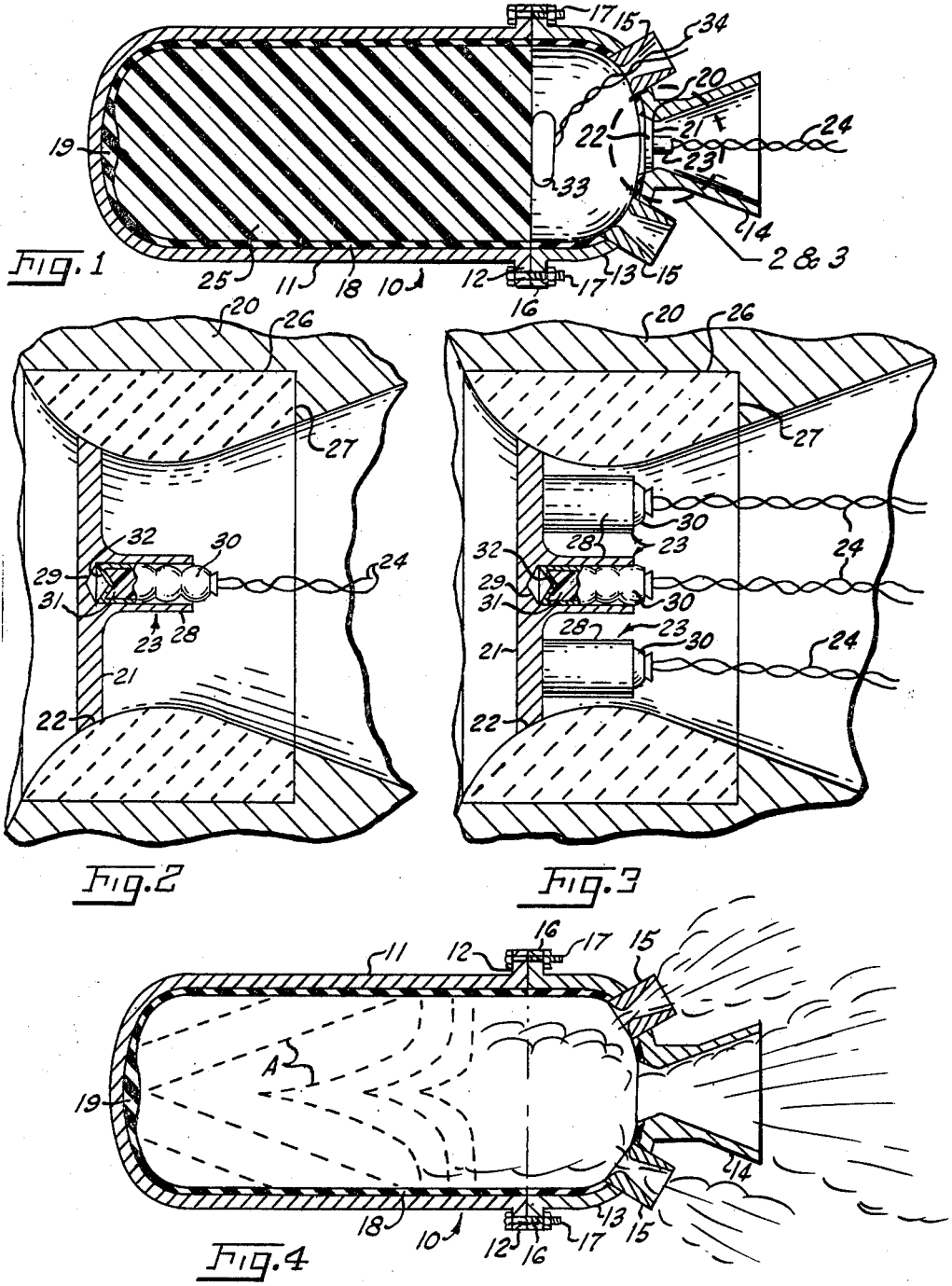

BY *Rolf Williams*

ATTORNEY

United States Patent Office 3,494,130
Patented Feb. 10, 1970

3,494,130
THRUST MODULATION DEVICE FOR SOLID
PROPELLANT ROCKET MOTORS
Samuel Zeman, Huntsville, Ala., assignor to Thiokol
Chemical Corporation, Bristol, Pa., a corporation
of Delaware
Filed June 17, 1968, Ser. No. 737,560
Int. Cl. F02k 9/04
U.S. Cl. 60—254   5 Claims

ABSTRACT OF THE DISCLOSURE

The injection of a high velocity medium into the solid propellant grain in a solid propellant rocket motor, so that as the burning surface area of the solid propellant grain is penetrated, thrust modulation of the solid propellant rocket motor will be achieved through an increase of the burning surface area of the solid propellant grain, and subsequent acceleration of the burning rate of the solid propellant grain by the creation of localized high mass velocities in the solid propellant grain.

BACKGROUND OF THE INVENTIION

Field of the invention

It is a well-known fact that the thrust of a solid propellant rocket motor can be modulated in flight through alterations in the nozzle throat area or variations in the burning surface area of a solid propellant grain or by a combination of both of the foregoing procedures.

The present invention was designed to accomplish several new and unique methods of accomplishing on command the increased thrust of a solid propellant rocket through variations of the well-known precepts.

In the past, many advancements and improvements have been made in technologies involving solid propellant grain, mechanical properties, explosives, miniaturizations of components, as well as changes in military requirements and the present invention has been designed to meet such changes as they may appear in the future by an increase of thrust on command. It is also conceivable that the present invention may be utilized to increase the mass discharge rate of a gas generator or may also be used to decrease the burning time of a solid propellant grain.

Description of the prior art

Many and various modes of operation to achieve the thrust modulation of a solid propellant rocket motor have been conceived, but none, it is believed, approaches in its mode of operation, that mode of operation covered by the present invention.

SUMMARY OF THE INVENTION

This invention relates to improvements in achieving thrust modulation of a solid propellant rocket motor and more particularly to the use of a high velocity medium that is adapted to penetrate the burning surface area of a solid propellant grain to increase the burning surface area and thereby increase the mass burning rate of the solid propellant grain.

The mass burning rate of a solid propellant grain refers to the rate of consumption of the mass or bulk of a solid propellant grain and is based on the unit weight per unit time while enclosed in a combustion chamber under known conditions of pressure, ambient solid propellant grain temperatures and gas-flow velocity and is measured in units that depend on the mass consumption per unit time.

Mass burning rate is opposed to the linear burning rate of a solid propellant grain which is based on the velocity at which the solid propellant grain is consumed in a direction normal to the burning surface under measured or specified conditions of pressure on the burning surface, ambient temperatures of the solid propellant grain and the velocity of the gas flow from the burning surface of the solid propellant grain and is measured in units of length per unit time and unlike mass burning rate is primarily a function of the chemical composition of the solid propellant grain and the operational environment under which the solid propellant grain is consumed and involves, as previously stated, the pressure on the burning surface of the solid propellant grain and the temperatures of the solid propellant grain.

The variations that are conceivable as to the mode of operation of the present invention may include a wide range of supersonic injection velocities and penetration depths depending on whether the injected medium is driven by gases accelerated through a supersonic nozzle or by means of a shock wave created by a detonating explosive or by means of a concentrated converging shock wave, such as is achieved by a conical or other type of shaped charge of high explosives. The injected medium, later described, may vary from a solid such as metallic powder, staple, wire, bee-bee, bullet, etc. to a gas such as a mixture of permanent gases, condensible metallic vapor or molten metals and salts.

It is an object of this invention, therefore, to provide a structure whereby a high velocity medium is caused to penetrate the burning surface area of a solid propellant grain to thereby increase the burning surface area of the solid propellant grain and increase the mass burning rate of the solid propellant grain and subsequently increasing the thrust.

With the above objects and advantages in view, as well as others that may appear to those skilled in the art, the invention consists of the various modes of operation more fully hereinafter described and illustrated in the accompanying drawings in which:

BRIEF DESCRIPTION OF THE DRAWINGS

FIGURE 1 is a longitudinal sectional view, showing one form of the invention embodying the invention, before the ignition of the solid propellant rocket motor and prior to the actuation of the jet perforator;

FIGURE 2 is a fragmentary sectional view of that area encompassed by the dotted circle 2 and showing the use of one jet perforator as mounted in the throat insert of a nozzle;

FIGURE 3 is a view similar to FIGURE 2 of the area encompassed by the dotted circle 3 and showing a plurality of jet perforators similarly mounted;

FIGURE 4 is a longitudinal sectional view of a solid propellant rocket motor showing by dotted lines the penetration of the solid propellant grain and the formation of conical-shaped burning surfaces therein;

DESCRIPTION OF THE PREFERRED EMBODIMENTS

Figure 5:
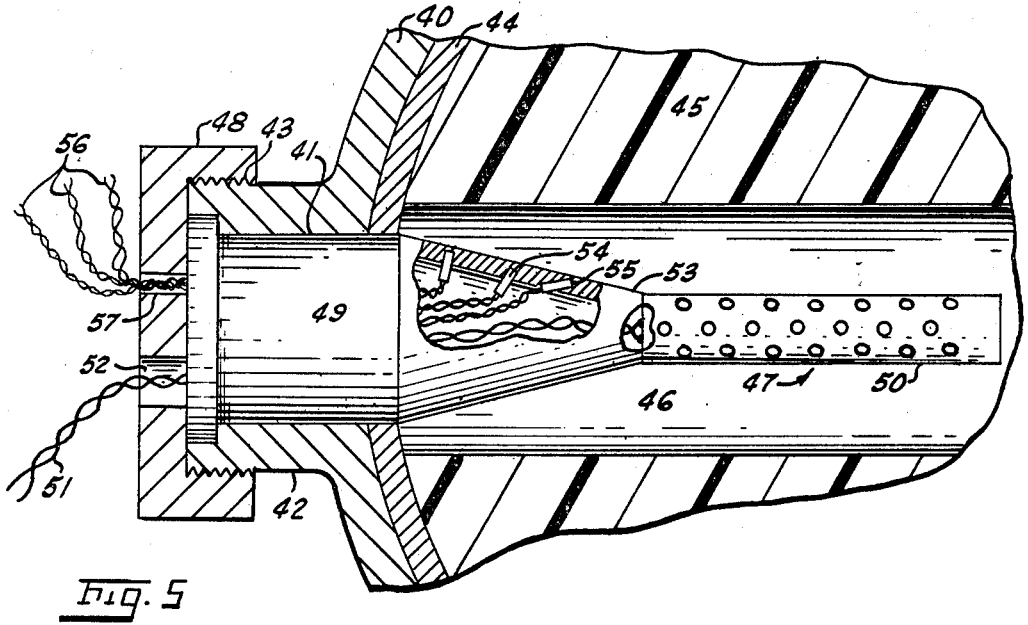
FIGURE 5 is a fragmentary detailed sectional view of another form of jet perforator embodying the invention.

Referring more in detail to the drawings, wherein like parts are designated by like reference numerals, the reference numeral 10 is generally used to designate a solid propellant rocket motor.

The rocket motor 10 comprises a motor case 11 having an open aft end about which is formed integrally therewith a right angularly extending annular flange 12, a dome-shaped nozzle 13 having a central exit cone 14 integral therewith centrally thereof and a plurality of control exit cones 15 positioned in the dome-shaped nozzle 13 and rigidly secured thereto in circumjacent relation to the central exit cone 14. The nozzle 13 also is provided with a right angularly extending annular flange 16 so that when it is in abutting relation with the flange 12 on the motor case 11 the nozzle 13 can be rigidly secured to the motor case 11 by fastening means 17 extended through the flanges 12 and 16.

The dome-shaped nozzle 13, as well as the motor case 11 are lined with a case bonded liner 18 and the liner 18 is provided at the head end of the motor case 11 with an enlarged portion 19 which will function as a cushioning means as will be later described.

In this form of the invention there is mounted in the throat area 20 of the central exit cone 14 by means of a circular plate 21 having a tapered peripheral edge 22 a jet perforator, conical charge or jet shaped charge 23, which is command actuated through electrical leads 24 and is suitably insulated from the heat of the combustion chamber formed by the motor case 11 into which has been cast a solid propellant grain 25.

For clarity of construction reference will now be made to FIGURES 2 and 3 wherein it will be noted that the plate 21 is mounted in a throat insert 26 that has been positioned in an annular recess 27 that has been provided in the throat area 20 of the exit cone 14. It will also be noted that the tapered peripheral edge 22 of the plate 21 is contoured to make close contact with the configuration of the interior wall of the throat insert 26.

The jet perforator 23 is shown to comprise a circular housing or socket 28 that is formed integral with the plate 21 and, as shown, there can be one housing or socket 28 as in FIGURE 2 or a plurality of housings or sockets 28 as in FIGURE 3. A cavity 29 is formed in the plate 21 at the base of the housing or socket 28 and the cavity 29 faces the burning surface of the solid propellant grain 25. A substantially cylindrical housing 30 having an explosive charge 31 therein is positioned in each of the housings or sockets 28 and surrounds a hollow conical depression 32 that is formed by the end of the housing and that part of the housing forming the depression 32 provides a conical-shaped penetrating medium in the inner end of the housing 30 that faces the cavity 29. The housing 30 and the penetrating medium 32 may be made from copper, lead, aluminum or steel and the explosive charge 31 surrounding the penetrating medium 32 is command actuated by the electrical leads 24, as previously stated which, as shown, extend outwardly of the exit cone 14 to a suitable command control system of conventional design, not shown.

Thus, when the explosive charge 31 is detonated, the penetrating meduim 32 will strike the cavity 29, which by its shape will weaken the plate 21 and the collapse of the plate will permit the entrance of extremely high jets of particles formed by the collapse of the penetrating medium 32 which will be capable of penetrating the burning surface of the solid propellant grain 25 to create conical burning surfaces A in the solid propellant grain 25 and achieve an increased mass burning rate for the solid propellant 25. The force which causes the penerating medium 32 to collapse and be injected into the solid propellant grain depends upon the diameter and length of the charge 31, thus, by regulating the size of the charge 31, the depth of penetration can be controlled. The jet perforator 23 will thus concentrate and focus shock waves and increase their velocity and the charge 31 may be sized to transmit high velocity gases and particles over large distances.

If the solid propellant grain comprises only a thin layer to be penetrated, the enlarged portion 19 of the liner 18 will serve to absorb the force of the penetrating medium 32 to prevent damage to the motor case 11 and inhibitors or barriers may be provided in the solid propellant grain 25 to control or limit the increase in the burning surface of the solid propellant grain 25 to meet predetermined operational requirements. Any debris that remains after the jet perforator 23 has been actuated will be blown outwardly of the exit cone 14 by the combustion gases created by the burning of the solid propellant grain 25.

Figure 7:
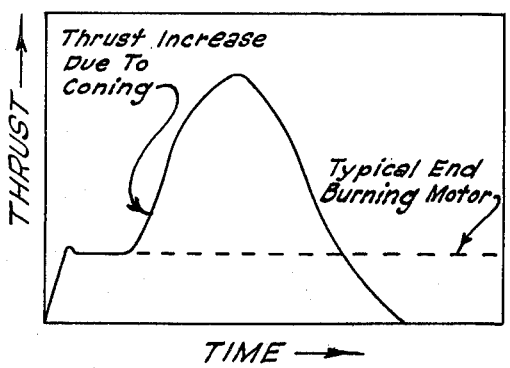
FIGURE 7 is a graph illustrating the typical thrust vs. time trace-shape in dotted lines of a solid propellant rocket motor without a jet perforator positioned therein and in solid lines the typical thrust vs. time trace-shaped of a solid propellant rocket motor having a jet perforator embodying the invention positioned therein.

Referring to FIGURE 7, the operation of solid propellant rocket motor equipped with the invention is illustrated. The solid propellant rocket motor 10 is ignited in the conventional manner by any well-known igniter 33 which is actuated in a conventional manner by means of electrical leads 34 that will extend through any one of the exit cones 15. At ignition the solid propellant grain 25 will burn with constant burning surface area and hence provide a constant thrust. If no additional stimulus is provided the thrust would continue through the web-burnout of the solid propellant grain 25, as shown by the dotted line in FIGURE 7, as indicated by a typical end burning motor, however, if the invention is carried out by firing the jet perforator 23, microseconds after the explosive charge 31 has forced the medium 32 into the solid propellant grain 25, the thrust will be increased as shown in the full line in FIGURE 7, as indicated by thrust increase due to coning. Thus, although the solid propellant rocket motor 10 is operating in the normal manner, the jet perforator 23 has created a cutting jet of supersonic gases and particles and it is estimated that the particles are travelling toward the solid propellant grain 25 at the rate of 10,000 to 25,000 feet per second, depending on the design of the charge 31 and as previously stated, the debris from the jet perforator 23 is ejected outwardly of the exit cone 14.

Figure 6:
FIGURE 6 is a fragmentary detailed sectional view showing a penetrating medium forming a conical-shaped surface in the solid propellant grain.

As previously stated, FIGURE 7 shows the effect of the operation of the jet perforator 23 on the burning surface area of the solid propellant grain 25 and on the thrust-time curves. As shown in FIGURE 6, the supersonic jet created by the activation of the jet perforator 23 has caused the medium 58 to penetrate and drill a hole in the solid propellant grain 25, thereby causing by means of the coning of the burning surfaces, subsurface ignition and an increasing burning surface area, as well as accelerated burning in the coning burning surfaces due to high mass velocity created in the solid propellant rocket motor 10. The effect of such action is a substantial increase in the thrust of the solid propellant rocket motor 10 and the effect on the pressure created in the solid propellant rocket motor 10 depends on the burning surface area and its relationship with the throat area of the exist cone 14. However, since the initial interaction of the activation of the jet perforator and the impact of the medium 32 on the burning surface of the solid propellant grain 25 will cause the rate of gas generation to exceed the rate of gas discharge, a thrust spike, due to discharge of accumulated gas, will occur.

In FIGURE 4 the dotted lines A show conical burning surface areas that are created in the solid propellant grain 25 after the actuation of the jet perforator 23. The original burning surface area, as shown in FIGURE 1, has regressed and as stated, the conical burning surface areas have increased. This results in a progressive increase in burning surface areas and a resulting increase in pressure and thrust. If, however, there is a desire to modulate the progressivity of the burning surface areas, inhibitors can be inserted into the solid propellant grain and thus limit the peak pressure and thrust.

One form of the invention, as shown in FIGURE 1, is adaptable for one concept of solid propellant rocket motors but in FIGURE 5 another form of solid propellant rocket motor is shown, wherein the reference numeral 40 is used to designate a fragment of the head end of a motor case which has a central opening 41 and an integral circular flange 42 that is in circumjacent relation to the opening 41 and has an extremely threaded end 43. The motor case as is conventional has a liner 44 case-bonded to the inner surface of the motor case and a solid propellant grain 45 is cast into the motor case. The solid propellant grain 45 has a cylindrical cavity 46 therein which is in alinement with the opening 41 and a combination jet perforator and igniter 47 is inserted into the opening 41 to extend into the cavity 46 as shown in the figure.

After the jet perforator and igniter 47 has been inserted into the opening 41, an internally threaded closure cap 48 is threadably engaged with the threaded end 43 of the flange 42 to rigidly retain the jet perforator and igniter 47 in the position shown in the figure.

An igniter usually comprises a mounting end 49 which is receivable in the flange 42 and an ignition portion 50 which is actuated remotely on command by electrical leads 51 that extend to the ignition portion 50 through an opening 52 in the closure cap 48.

In this form of the invention a hollow conical-shaped housing 53 is inserted between and rigidly secured to the mounting end 49 and the ignition portion 50 to provide an integral unit which as designated is referred to as the jet perforator and igniter 47.

Explosive charges 54, as previously described, are mounted in cavities 55 in the inner surface of the housing 53 and electrical leads 56 that extend through an opening 57 in the closure cap 48 are used to command actuate the explosive charges 54 by a remote command controlled assembly of conventional type. It is to be understood that more explosive charges than those shown may be utilized and also more openings 57 may be provided in the closure cap 48.

The operation of this form of the invention is identical with the form previously described, the solid propellant grain 45 is ignited by the ignition portion 50 and the explosive charges 54 may then be actuated to increase the burning surface areas of the cylindrical cavity 46, as previously described.

The invention and its mode of operation are not, therefore, limited to only one form of solid propellant rocket motor, but as shown, may be utilized with several forms of solid propellant rocket motors. One or more jet perforators may be used and it is also not necessary to increase the nozzle throat area upon the actuation of the jet perforator. Also proper orientation could provide for the mounting of a plurality of jet perforators so that a variety of such mountings in any one solid propellant rocket motor could be achieved to provide a variety of types of penetration of the solid propellant grain.

It is to be understood that for safety reasons the jet perforator must be protected from the thermal environment of an operating solid propellant rocket motor to achieve proper functioning of the jet perforator, but excessive heat will not necessarily cause the jet perforator to detonate, but instead will cause it to melt, by the use of appropriate materials, and fail safe.

As previously described the medium 32 is preformed and utilized to cause deep penetration, however, small pieces of metal or ceramic particles may be used as the medium of penetration. A plurality of small holes would thus be created in the burning surface area of the solid propellant grain which would be shallow as compared to the holes created by the medium 32. The small holes would result in a sudden pulse or increase in the mass rate of gas generation and the resultant thrust, but the effect of such small holes would be of short duration, because the burning surface area would quickly return to normal.

As previously stated, the penetrating medium 58 may be bee-bees, bullets or sharp pieces of wire which are forced by the explosive charge 31 into the burning surface area of the solid propellant grain to increase the conical burning surface areas A, subsurface ignition and increased thrust, as shown in FIGURE 6.

It is also possible to mount the jet perforator on the flight vehicle of a solid propellant rocket motor so that the medium can be forced through the exit cone from a remote location, thus the distance that the medium has to travel before penetration can be measured and an explosive charge having sufficient force to cause the medium to penetrate the burning surface of the solid propellant grain can be utilized.

It is believed that from the foregoing description the mode of operation and the construction of the embodiments of the invention will be clear to those skilled in the art and it is also to be understood that variations in the mode of operation and construction of the embodiments of the invention may be adhered to provided such variations fall within the spirit of the invention.

Having thus described the invention what is claimed as new and desired to be secured by Letters Patent is:

1. A thrust modulation device for a solid propellant rocket motor including a motor case forming a combustion chamber therein in which is cast a solid propellant grain having a burning surface area, a nozzle having a plurality of exit cones secured to said motor case, one or more explosive charges mounted in said exit cones, a penetrating medium contacting said explosive charge and facing the burning surface of said solid propellant grain means for actuating said explosive charge for causing said medium to penetrate and increase the burning surface area of said solid propellent grain to thereby increase the mass burning rate of said solid propellant grain and thus obtain thrust modulation of said solid propellant rocket motor.

2. A thrust modulation device as in claim 1, wherein a cylindrical plate having a tapered peripheral edge and provided with cylindrical housings to receive said explosive charges and thereby mount said explosive charges in said exit cones.

3. A thrust modulation device as in claim 1, wherein said explosive charges are provided with electrical leads whereby upon command said explosive charges will be actuated.

4. A thrust modulation device as in claim 1, wherein ignition means for said solid propellant brain is positioned in coacting relation with said explosive charges.

5. A thrust modulation device as in claim 1, wherein the inner ends of said explosive charges are provided with a conical-shaped cavity to form said penetrating mediums which are shaped to conform to said conical-shaped cavities.

References Cited

UNITED STATES PATENTS

| 3,134,225 | 5/1964 | Pennington | 60—254 XR |
| 3,143,853 | 8/1964 | Sobey | 60—254 |
| 3,167,912 | 2/1965 | Ledwith | 60—254 XR |

CARLTON R. CROYLE, Primary Examiner

U.S. Cl. X.R.

60—263